United States Patent
Tharpe

[19]

[11] Patent Number: 6,145,624
[45] Date of Patent: Nov. 14, 2000

[54] GREASE COUPLING FOR THE STEERING CABLE OF AN OUTBOARD MOTOR, AND METHOD OF MAKING

[76] Inventor: Johnny Tharpe, 1180A Beach Dr., Calabash, N.C. 28467

[21] Appl. No.: 08/954,235

[22] Filed: Oct. 20, 1997

[51] Int. Cl.[7] .................................................. F16N 7/00
[52] U.S. Cl. ...................... 184/15.1; 184/105.3; 440/62; 74/502.4; 74/502.6
[58] Field of Search .................. 184/15.1, 15.2, 184/15.3, 105.3; 74/500.5, 501.5 R, 502, 502.4, 502.6; 440/53, 61, 62, 63, 113; 403/270, 271, 272, 299

[56] References Cited

U.S. PATENT DOCUMENTS

| | | | |
|---|---|---|---|
| 2,474,980 | 7/1949 | Karl | 384/397 |
| 3,565,213 | 2/1971 | Heller | 184/15.2 |
| 5,107,961 | 4/1992 | Schott et al. | 184/15.1 |
| 5,164,154 | 11/1992 | Brown et al. | 376/364 |
| 5,326,292 | 7/1994 | Brushabel | 440/62 |
| 5,560,655 | 10/1996 | Cameron | 184/15.2 |

FOREIGN PATENT DOCUMENTS

| | | | |
|---|---|---|---|
| 2498292 | 7/1982 | France | 184/15.1 |
| 283293 | 1/1928 | United Kingdom | 184/15.1 |
| 0302820 | 12/1928 | United Kingdom | 184/15.1 |

*Primary Examiner*—Tamara L. Graysay
*Assistant Examiner*—Chong H. Kim

[57] ABSTRACT

The grease coupling of this invention is made from three elements that are conventional and readily available: a nut; an externally threaded tube; and a grease fitting. These three elements are integrated to define an effective grease coupling to lubricate a steering cable that extends through an outer sheath from the steering wheel to the outboard motor of a boat. The method of making the grease coupling enables a competent mechanic to custom-make an efficient grease coupling, and also minimizes the cost of mass producing the grease coupling.

2 Claims, 2 Drawing Sheets

GREASE COUPLING FOR THE STEERING CABLE OF AN OUTBOARD MOTOR, AND METHOD OF MAKING

FIELD OF THE INVENTION

This invention relates to a grease coupling specifically intended for the lubrication of the steering cable of an outboard motor, and to the method of making the grease coupling.

BACKGROUND OF THE INVENTION

Outboard motors in use today are operated with a steering system commonly known as the sheathed cable steering system. The sheathed cable steering system includes a steering wheel affixed to a helm unit which converts rotation of a steering wheel to a linear push-pull action of a steering cable within a cable sheath. The sheathed cable extends rearwardly from the helm unit to a motor location where the cable sheath is fixed to a cable mounting tube which is an integral part of the motor mount. The steering cable extends from the cable sheath and through the cable mounting tube and terminates in a connection to the outboard motor. Rotation of the steering wheel effects an extension or a retraction of the steering cable relative to the cable sheath and a corresponding pivoting action of the outboard motor to change the direction of travel.

Use of the sheathed cable steering system inevitably results in the entry of corrosive materials such as seawater into the cable mounting tube, causing corrosion and increased friction while steering and to ruination of the system if allowed to continue beyond a reasonable time.

It is known in the art that lubrication of the cable reduces corrosion, and U.S. Pat. No. 5,385,493 issued Jan. 31, 1995 to Nelson for SYSTEM FOR INTRODUCING A LUBRICANT. The structure of the Nelson patent is particularly adapted for use with the sheathed cable steering system for outboard motors, but it does not deliver the lubricant to the steering cable as effectively as the apparatus of the present invention.

SUMMARY OF THE INVENTION

The grease coupling of this invention is mounted for use between the motor mount for an outboard motor and the outer sheath of a steering cable. The steering cable extends from a steering wheel and is operably coupled to the motor in a known manner, after passing through the grease coupling of this invention.

According to the invention, a conventional grease fitting, a conventional nut and a conventional externally threaded tube are integrated to define an effective grease coupling. The tube is short, of a predetermined length, and is threaded a predetermined short distance into the nut. The nut and tube are then welded or otherwise joined together. A hole to accommodate the grease fitting and to deliver grease to the threaded interior of the nut is then drilled through the wall of the nut. A conventional grease fitting is operably mounted in the hole and means are provided for the inner end of the grease fitting to communicate with the interior of the nut to provide ready passage for grease to the steering cable that will pass through the grease coupling in use.

The use of a conventional and readily available nut, a conventional and readily available externally threaded tube, and a conventional and readily available grease fitting to make the grease coupling enables a competent mechanic to custom-make an efficient grease coupling, greatly reduces the cost of manufacture, and provides more efficient lubrication of the steering cable than has been heretofore available.

DETAILED DESCRIPTION OF THE INVENTION

Figure 1:
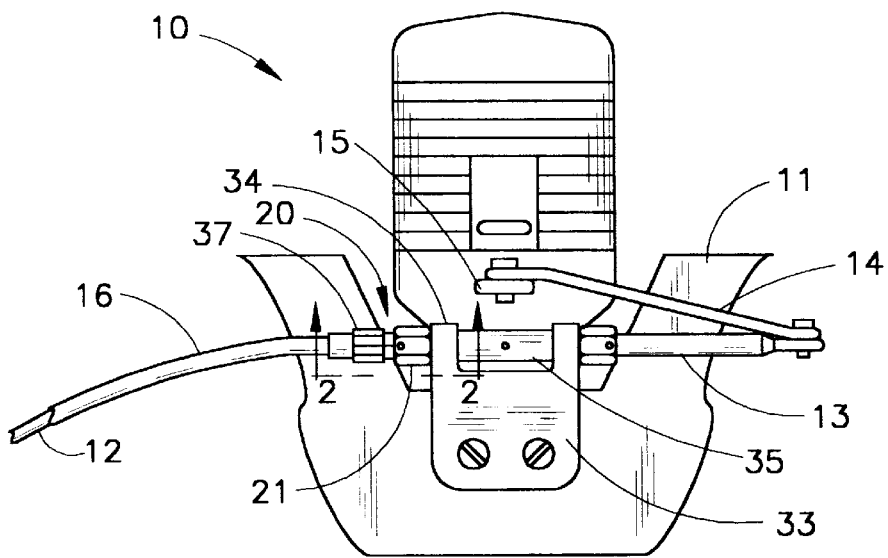
FIG. 1 is an elevation of an outboard motor mounted on the transom of a boat to illustrate the environment of the invention.

FIG. 1 shows an outboard motor 10 mounted in a conventional manner on a boat's transom 11. The boat is guided by mechanism that pivots the motor in response to rotation of a steering wheel, not shown. That mechanism is described in U.S. Pat. No. 5,385,493 issued Jan. 31, 1995 to Nelson for SYSTEM FOR INTRODUCING A LUBRICANT, but except for the few parts shown in FIG. 1, an understanding of that mechanism is not necessary for an understanding of the grease coupling of this invention.

Referring to FIG. 1, a steering cable 12 is operably connected to the boat's steering wheel (not shown) and to the motor 10. Clockwise rotation of the steering wheel causes linear retraction of the steering cable 12 and corresponding retraction of a rigid rod 13 pivotally connected to a steering link 14 that extends to a tiller arm 15 of the motor 10. Counterclockwise rotation of the steering wheel causes linear extension of the steering cable 12 and corresponding extension of the rod 13 to turn the boat in the opposite direction, as is well known.

The steering cable 12 is mounted in an outer sheath 16 for protection but the steering cable remains vulnerable to corrosive elements, such as seawater, and requires frequent lubrication. This invention provides a grease coupling 20 that effectively lubricates the steering cable.

Figure 3:
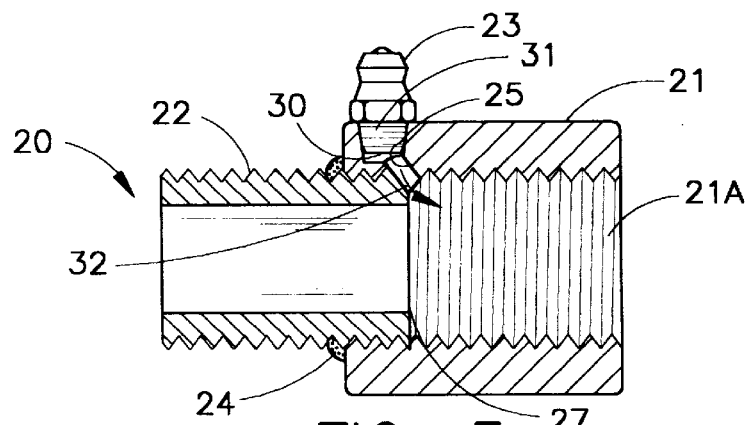
FIG. 3 is an enlarged sectional view of the grease coupling.

The grease coupling 20 comprises a conventional nut 21, a conventional externally threaded tube 22, and a conventional grease fitting 23. The three elements are integrated, as illustrated in FIGS. 4A, 4B, 5A and 5B, to define the grease coupling 20 (FIG. 3).

Figure 4A:
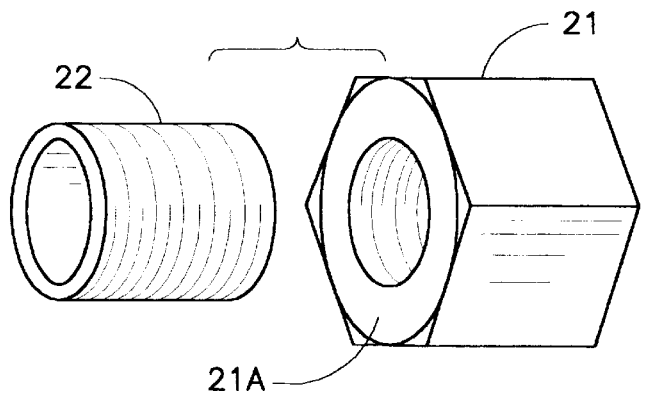
FIG. 4A is an exploded perspective view of the short length of externally threaded tubing and of the nut.

FIG. 4A illustrates the short length of externally threaded tube 22 in position to be partially threaded into the nut 21. The dimensions of the nut 21 and tube 22 correspond with the dimensions of connecting parts in the steering mechanism with which the grease coupling 20 will be used.

In the illustrated embodiment, the threaded interior of the nut 21 is ¾ of an inch long and the nut has an internal diameter of ⅞ of an inch, corresponding with the ⅞ of an inch external diameter of the tube 22. The internal diameter of the tube 22 is ⅝ of an inch to slidably receive a correspondingly sized steering cable 12.

Figure 4B:
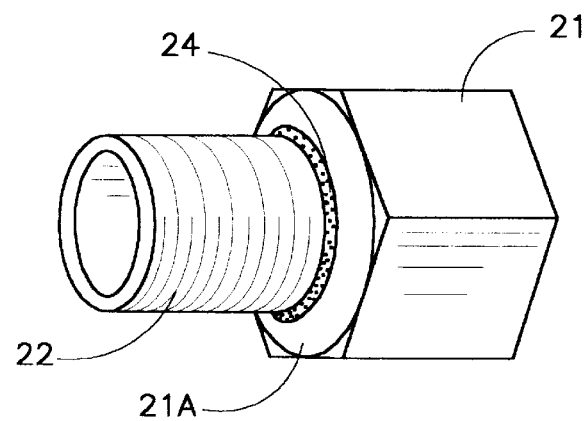
FIG. 4B is a perspective view of the tubing and nut shown in FIG. 4A after the tubing has been threaded into the nut a predetermined distance and then welded to the nut.
Figure 5A:
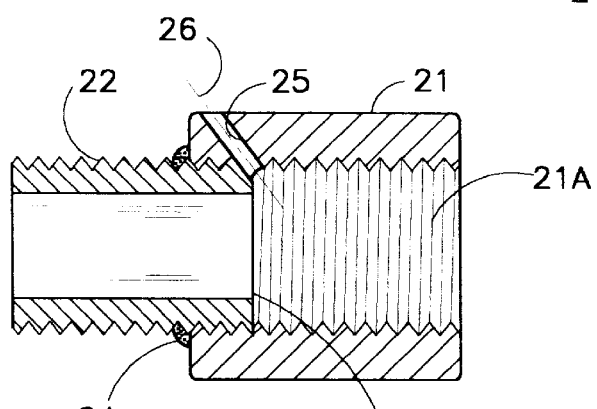
FIG. 5A is a sectional view of the tubing and nut shown in FIG. 4B after a hole has been drilled to accommodate a conventional grease fitting.
Figure 5B:
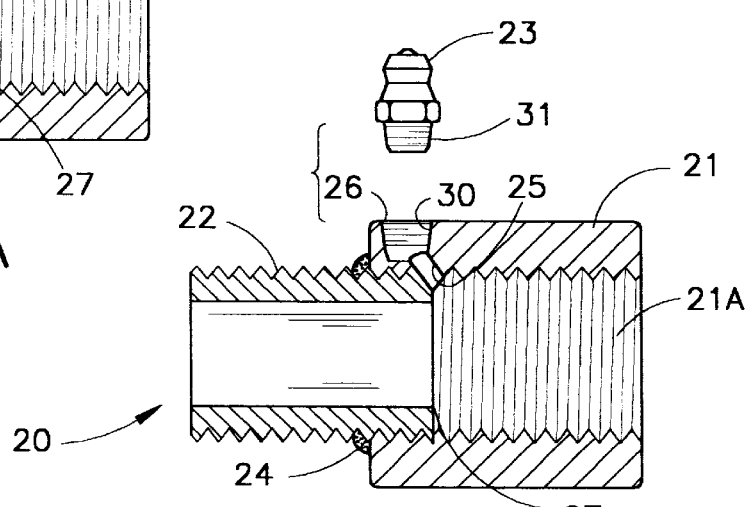
FIG. 5B is an exploded sectional view, partially in elevation, of the grease fitting positioned to be inserted in the hole and joined with the nut.

In assembling the grease coupling 20, the first step is to partially thread the tube 22 into one end 21A of the nut 21 (FIGS. 4A and 4B). A threaded distance of no more than ¼ of an inch from the end 21A is preferred. Then, as illustrated in FIG. 4B, the tube 22 is fastened to the one end of the nut 21, as by a weld 24.

The next step is to drill a small diameter passageway 25 (preferably ¼ of an inch) extending at an angle (preferably between 10 and 20 degrees) from a point 26 on the outside of the nut close to the end 21A, into the threaded interior of the nut and through the inner portion of the tube 22 communicating with the inner edge 27 of the tube.

Next, an internally threaded bore 30 is formed in the nut 21 to receive the externally threaded end portion 31 of the grease fitting 23. The larger diameter bore 30 extends into and communicates with the angled passageway 25 so that lubricant passing through the grease fitting in a conventional manner will also pass through the angled passageway, as indicated by the arrow 32 in FIG. 3.

Referring to FIG. 1, the outboard motor 10 is connected to the transom 11 by a motor mount 33, including a tilt hinge 34. An externally threaded mounting tube 35 extends through the tilt hinge 34. The nut 21 of the grease coupling 20 is threaded on the end 36 (FIG. 2) of the mounting tube 35 distal from the rigid rod 13 after the outer sheath 16 is disconnected from the mounting tube 35. A sheath nut 37 then connects the outer sheath 16 of steering cable 12 to the externally threaded tube 22 of grease coupling 20.

Figure 2:
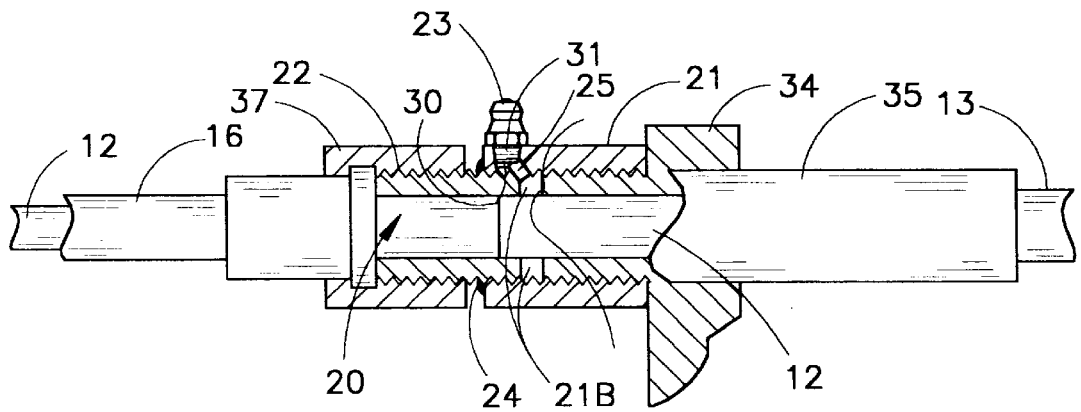
FIG. 2 is a sectional view, partially in elevation, taken substantially along the line 2—2 in FIG. 1.

When the grease coupling 20 is fully threaded on the mounting tube 35, the end 36 of the mounting tube is spaced from the end 27 of the tube 22, leaving an annular space 21B around the steering cable within the nut 21, as seen in FIG. 2. The angled passageway 25 terminates in communication with the space 21B, and grease pumped into the grease fitting 23 is delivered directly to the annular space 21B to provide a circumferential coating of grease around the steering cable 12. The grease within the annular space 21B lubricates the steering cable within the nut 21 during normal reciprocatory movement of the steering cable through the grease coupling 20 while steering the boat.

There is thus provided an effective grease coupling capable of being customformed by boat mechanics from conventional materials readily at hand, and equally capable of being mass produced.

Although specific terms have been employed in describing the invention, they have been used in a descriptive and generic sense only and not for the purpose of limitation, the scope of the invention being defined in the appended claims.

I claim:

1. A method of making a grease coupling for use in lubricating a steering cable that extends beyond an outer sheath's connection to an externally threaded end portion of a mounting tube and then to a rigid rod that is connected to a steering link and tiller arm of an outboard motor, said method of making the grease coupling comprising the steps of:

providing a nut having a threaded interior complementing the externally threaded end portion of the mounting tube and the threaded interior of the nut being of sufficient length that one end of the nut extends beyond the mounting tube when the nut is fully seated on the externally threaded end portion of the mounting tube;

providing an exteriorly threaded tube complementing the threaded interior of the nut;

defining a space of a desired length within the threaded interior of the nut after the nut is fully seated on the externally threaded end portion of the mounting tube, said space of a desired length being formed by first threading the externally threaded tube into a second end of the nut a predetermined distance to locate the end of the externally threaded tube in the nut where it will be spaced from the proximal end of the mounting tube a distance equal to said space of a desired length after the nut is fully seated on the externally threaded end portion of the mounting externally threaded tube and then permanently joining the tube and the nut;

providing an externally threaded grease fitting;

drilling a threaded bore into the nut near said second end of the nut to accommodate the grease fitting; and providing communication between the threaded bore and said space of a desired length within the threaded interior of the nut, the communication being provided by a previously drilled passageway that communicates with the threaded bore and with said space of a desired length in the threaded interior of the nut and wherein the previously drilled passageway was drilled from a point on the outside of the nut through the inner end portion of the externally threaded tube communicating with the inner end of the externally threaded tube and with said space of a desired length in the threaded interior of the nut, whereby grease pumped into the grease fitting will be delivered to said space of a desired length to lubricate the steering cable when the grease coupling is operatively assembled on the mounting tube.

2. The method of claim 1 wherein the previously drilled passageway extends at an angle between 10° to 20°.

* * * * *